(12) United States Patent
Nikolaus

(10) Patent No.: US 7,066,022 B2
(45) Date of Patent: Jun. 27, 2006

(54) AIRSPEED SENSOR AND METHOD FOR OPERATING AN AIRSPEED SENSOR

(75) Inventor: Gerhard Nikolaus, Engerwitzdorf (AT)

(73) Assignee: E+E Elektronik Ges.m.b.H., Engerwitzdorf (AT)

( * ) Notice: Subject to any disclaimer, the term of this patent is extended or adjusted under 35 U.S.C. 154(b) by 156 days.

(21) Appl. No.: 10/492,436

(22) PCT Filed: Oct. 4, 2002

(86) PCT No.: PCT/EP02/11183

§ 371 (c)(1),
(2), (4) Date: Apr. 13, 2004

(87) PCT Pub. No.: WO03/034002

PCT Pub. Date: Apr. 24, 2003

(65) Prior Publication Data

US 2004/0237643 A1    Dec. 2, 2004

(30) Foreign Application Priority Data

Oct. 10, 2001    (DE) .............................. 101 49 867

(51) Int. Cl.
*G01F 1/68* (2006.01)

(52) U.S. Cl. .................................. 73/204.15

(58) Field of Classification Search ............. 73/861.95, 73/204.17, 861.02, 861.05, 204.5; 137/10
See application file for complete search history.

(56) References Cited

U.S. PATENT DOCUMENTS

| | | | | |
|---|---|---|---|---|
| 4,228,815 A | * | 10/1980 | Juffa et al. ................... 137/10 |
| 4,237,730 A | * | 12/1980 | Feng .......................... 73/861.95 |
| 4,458,709 A | * | 7/1984 | Springer ....................... 137/10 |
| 4,483,200 A | * | 11/1984 | Togawa et al. ........... 73/861.95 |
| 4,501,145 A | | 2/1985 | Boegli et al. |
| 4,537,068 A | * | 8/1985 | Wrobel et al. ........... 73/861.02 |
| 4,628,743 A | * | 12/1986 | Miller, Jr. et al. ....... 73/861.95 |
| 4,667,516 A | * | 5/1987 | Schulz ........................ 73/708 |
| 4,821,568 A | * | 4/1989 | Kiske ....................... 73/204.17 |
| 6,223,593 B1 | * | 5/2001 | Kubisiak et al. .......... 73/204.15 |

FOREIGN PATENT DOCUMENTS

| | | |
|---|---|---|
| DE | 36 37 497 | 7/1987 |
| DE | 37 10 224 | 10/1988 |
| DE | 199 39 942 | 3/2001 |
| GB | 2 297 767 | 5/1996 |

OTHER PUBLICATIONS

Foss et al., "The pulse width modulated-constant temperature", Meas, Sci. Technol. 7, Jan. 10, 1996, pp. 1388-1395.*.

* cited by examiner

*Primary Examiner*—Edward Lefkowitz
*Assistant Examiner*—Jewel V. Thompson
(74) *Attorney, Agent, or Firm*—Kenyon & Kenyon

(57) ABSTRACT

In an air-velocity sensor and a method for operating an air-velocity sensor, the air-velocity sensor includes a temperature sensor arranged in an air flow and sequential electronics. The sequential electronics are used to cyclically impinge upon the temperature sensor with a define heat output and to determine the temperature rise time required by the temperature sensor to heat up to a given temperature difference after being impinged upon with the heat output. Temperature measurements are performed at a defined measuring frequency. The velocity of the air flow is determined on the basis of temperature rise time.

23 Claims, 4 Drawing Sheets

AIRSPEED SENSOR AND METHOD FOR OPERATING AN AIRSPEED SENSOR

FIELD OF THE INVENTION

The present invention relates to an air-velocity sensor and to a method for operating an air-velocity sensor.

BACKGROUND INFORMATION

Air-velocity sensors, which are based on the so-called constant-temperature or excess-temperature method and are normally referred to as hot-film anemometers, are conventional for measuring air-flow velocities. Such air-velocity sensors are marketed by the Applicant hereof under, for instance, model designations EE60, EE61, EE62, EE65 or EE70. Such air-velocity sensors include, inter alia, two separate sensors, which are positioned in the flowing medium, e.g., air, whose flow velocity should be determined. In this connection, a first sensor, the temperature sensor, is used for determining the temperature of the flowing medium and tracks its temperature as accurately as possible. The second sensor, the heat sensor, constitutes, in principle, a temperature sensor as well and is adjusted to a constant temperature difference with respect to the first sensor by supplying electric power. The electrical heating power necessary for this represents a direct measure of the mass flow rate or the flow velocity to be determined.

Air-velocity sensors constructed in such a manner require a relatively high heating power. Thus, if such an air-velocity sensor is intended to be operated by a battery, then the result is only very short operating times. When two batteries having each an operating voltage of 1.5 V and a capacity of approximately 2600 mAh are used, the result is typically a possible operating time between just 10 and 20 hours.

An operation, which saves as much power as possible, is, for example, possible, when such an air-velocity sensor is cyclically heated and repeated cools down in the air flow in question. The current air velocity may then be deduced from the required heating time. Reference is made, for example, to U.S. Pat. No. 4,501,145, German Published Patent Application No. 36 37 497 or German Published Patent Application No. 199 39 942 for such variants of measuring air velocity.

It is an aspect of the present invention to provide a further improved air-velocity sensor, as well as an improved method for operating an air-velocity sensor in a power-saving manner.

SUMMARY

The foregoing and other beneficial aspects may be achieved by providing a air-velocity sensor having the features described herein.

Example embodiments of the air-velocity sensor according to the present invention are described herein.

In addition, the foregoing aspect may be achieved by providing a method for operating an air-velocity sensor, having the features described herein.

Example embodiments of the method according to the present invention are described herein.

It is provided, that only one single sensor element in the form of a temperature sensor is to be used in the air-velocity sensor of an example embodiment of the present invention, which is cyclically or periodically acted upon by a certain heating power and, therefore, not heated for most of the time during the actual measuring operation. To determine the air velocity, the heating time needed by the temperature sensor to heat up by a particular temperature difference is measured. The ascertained heating time represents the measure for the specific flow velocity. The relationship between heating time and flow velocity evaluated in this connection is ascertained in one or more calibration measurements prior to the actual measuring operation, and a corresponding calibration curve is stored in the sequential electronics.

Therefore, since the temperature sensor only has to be heated within the specific heating cycles, the result may be a significant reduction in the current consumption or power consumption, which allows, in turn, markedly longer operating times, e.g., during battery operation.

In addition, a simple overall system may be produced, since, in comparison with the constant-temperature variant of an air-velocity sensor mentioned at the outset, a controller may no longer be necessary.

In addition, a simple interface may result between the air-velocity sensor and any post-connected microcontrollers, since only the signals of a single sensor element must be further processed.

The sensor and method may also be used for measuring the flow velocity of other gaseous media. Furthermore, there are diverse possibilities regarding how and where the sequential electronics of the air-velocity sensor may be positioned. Thus, it is equally possible, for instance, to position them in direct proximity to the temperature sensor, or to position them spatially further away via a suitable signal connection.

In addition, the sensor and method may be used for both the measurement of air velocity explained below and the measurement of mass flow rate.

In an example embodiment of the present invention, an air-velocity sensor includes: a temperature sensor configured to be arranged in an air flow; and sequential electronics configured to cyclically apply a predetermined heating power to the temperature sensor and to determine a heating time required by the temperature sensor to heat up by a predetermined temperature difference after being acted upon by the heating power, the sequential electronics configured to perform a regular temperature measurement at a predetermined measuring frequency to determine the heating time, the measuring frequency selected as a function of a flow velocity of the air flow and adapted to the flow velocity during a continuous measuring operation, the flow velocity determinable from the heating time.

In accordance with an example embodiment of the present invention, a method for operating an air-velocity sensor, which includes a temperature sensor arranged in an air flow and sequential electronics, includes: cyclically acting upon the temperature sensor by a predetermined heating power by the sequential electronics; determining by the sequential electronics a heating time required by the temperature sensor to heat up by an amount of a predefined temperature difference after being acted upon by the heating power, including performing a regular temperature measurement by the sequential electronics at a predetermined measuring frequency to determine the heating time; determining a flow velocity of the air flow from the heating time; and selecting the measuring frequency as a function of the flow velocity and adapting the measuring frequency to the current velocity during a continuous measuring operation.

In accordance with an example embodiment of the present invention, an air-velocity sensor includes: a temperature sensing means configured to be arranged in an air flow; and sequential electronics means for cyclically applying a predetermined heating power to the temperature sensor and for determining a heating time required by the temperature sensor to heat up by a predetermined temperature difference after being acted upon by the heating power, the sequential electronics means for performing a regular temperature measurement at a predetermined measuring frequency to determine the heating time, the measuring frequency selected as a function of a flow velocity of the air flow and adapted to the flow velocity during a continuous measuring operation, the flow velocity determinable from the heating time.

Further aspects and details pertaining to the sensor and method are set forth in the following description of an exemplary embodiment, on the basis of the appended Figures.

DETAILED DESCRIPTION

Figure 1:
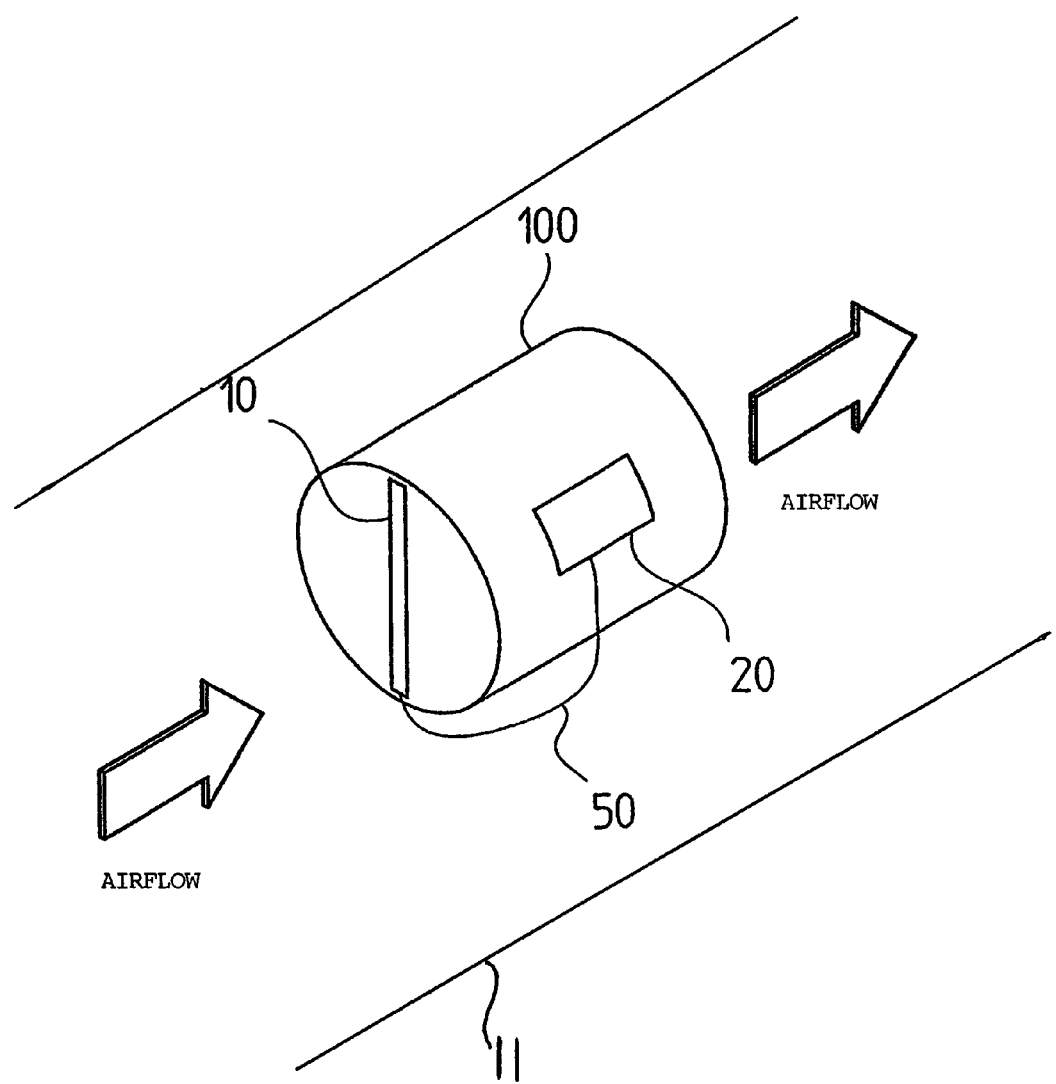
FIG. 1 is a schematic view of an exemplary embodiment of the air-velocity sensor according to the present invention, positioned on a tube through which the flowing medium travels.

An exemplary embodiment of the air-velocity sensor of the present invention, which is used to determine the speed of the air flowing through a tube 100, is shown in FIG. 1 in a highly schematized form. The air-velocity sensor used for this includes a sensor element in the form of a temperature sensor 10, and sequential electronics 20, which are connected to temperature sensor 10 by a connecting line 50.

In the represented example, temperature sensor 10 is situated in the air flow, i.e., in tube 100, whereas sequential electronics 20 are situated in a housing, which is attached to the outer wall of tube 100.

As a alternative to such a design, it is possible to position the air-velocity sensor on a probe tube 11, which is then situated, on its part, in the air flow in question. In this case, the temperature sensor may be situated, for example, at the tip of the probe tube, and the sequential electronics may be positioned spatially separately from this, on the housing of the probe tube 11.

The air-velocity sensor is operated in such a manner, that temperature sensor 10 is cyclically acted upon by a specific heating power, via sequential electronics 20. Heating time $\Delta t_j$, which temperature sensor 10 requires for heating up by the amount of specific, predefined temperature difference $\Delta T_j$ after being acted upon by the heating power, is determined by sequential electronics 20. Flow velocity $v_S$ in question may then be determined from ascertained heating time $\Delta t_j$.

Figure 2:
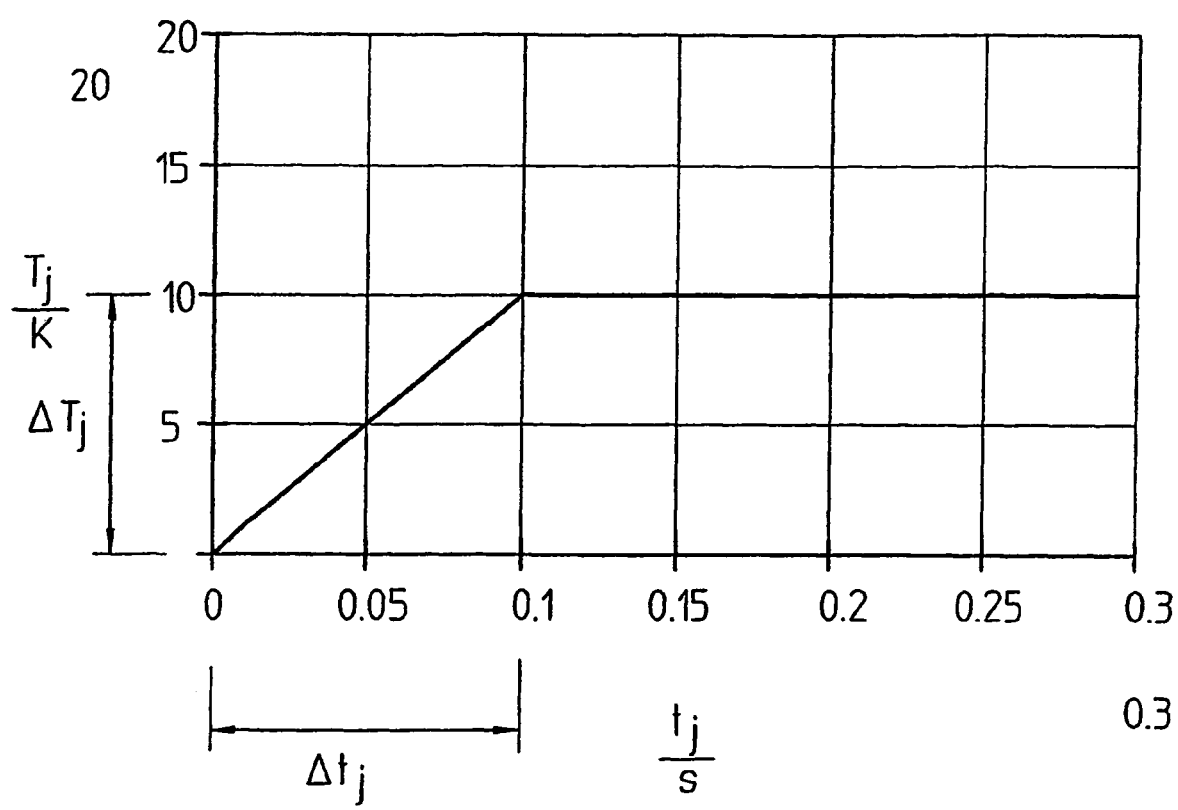
FIG. 2 illustrates the relationship between heating time $t_j$ and excess temperature $T_j$ of the temperature sensor in the case of flow velocity $v_S$=0 m/sec.
Figure 3:
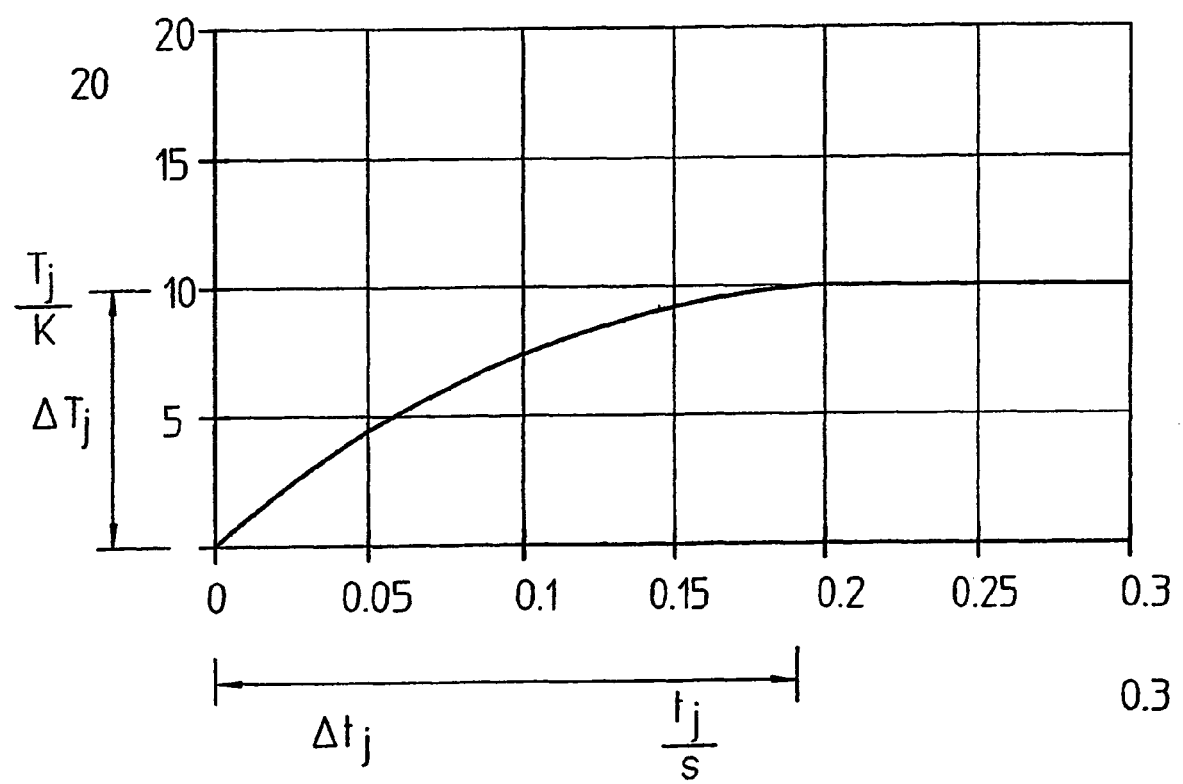
FIG. 3 illustrates the relationship between heating time $t_j$ and excess temperature $T_j$ of the temperature sensor in the case of flow velocity $v_S$=35 m/sec.

For a further explanation of this procedure, reference is made to FIGS. 2 and 3, which each illustrate the relationship between heating time $t_j$ as of the start of measuring, and temperature or excess temperature $T_j$ of the temperature sensor, for different flow velocities $v_S$. In this connection, the relationship in the case of flow velocity $v_S$=0 m/sec is represented in FIG. 2, while FIG. 3 illustrates the corresponding relationship in the case of flow velocity $v_S$=35 m/sec. As is apparent from the two representations, the temperature sensor may require, in the case of higher flow velocity $v_S$=35 m/sec, considerably more time to reach a specified excess temperature $T_j$=10 K. Thus, according to FIG. 2, heating time $\Delta t_j$ is only approximately equal to 0.1 sec for a temperature difference $\Delta T_j$=10 K at flow velocity $v_S$=0 m/sec, while, according to FIG. 3, corresponding heating time $\Delta t_j$ approximately equals 0.19 sec at a flow velocity $v_S$=35 m/sec.

Therefore, flow velocity $v_S$ in question may be determined from heating time $\Delta t_j$ needed by the temperature sensor to heat up by the amount of a particular, specified temperature difference $\Delta T_j$. Thus, at least one calibration curve, which indicates the relationship between heating time $\Delta t_j$ and corresponding flow velocity $v_S$ for the instance of predefined heating by the amount of a specific temperature difference $\Delta T_j$ of the temperature sensor, must be recorded prior to the actual measurement. In the course of the actual measurement, the calibration curve is used for determining flow velocity $v_S$ from measured heating times $\Delta t_j$. The calibration curve is stored in a suitable storage medium of the sequential electronics.

As long as the heating pulse in question is applied to the temperature sensor, the temperature of the temperature sensor is cyclically determined at defined measuring times $t_{M,i}$, until the temperature sensor is heated by the amount of predefined temperature difference $\Delta T_j$. As is explained in detail in the following, the temperature may be determined here, from the measured resistance values of the temperature sensor, which is why a suitable voltage measurement is carried out. In order to determine the temperature of the temperature sensor as precisely as possible, it may be provided to amplify the measured voltage with the aid of an amplifier circuit, before the measured voltage is transmitted to a microprocessor in the sequential electronics for further processing.

In this connection, the mentioned, cyclical temperature measurement is carried out at specific measuring times $t_{M,i}$, at a specific measuring frequency $f_M$. In this connection, it may be provided that, when measuring frequency $f_M$ is selected as a function of flow velocity $v_S$ or continuously adapted to it during the measuring operation, for instance, sharply changing flow velocities render this necessary. In this respect, this is practical, since it takes a relatively long time, particularly in the case of low flow velocities $v_S$ (<0.5 m/sec), for the heated temperature sensor to cool down again to the ambient temperature. Therefore, a lower measuring frequency $f_M$ may be used for the cyclical temperature measurement at low flow velocities $v_S$, whereas a higher measuring frequency $f_M$ is used at higher flow velocities $v_S$. Thus, measuring frequency $f_M$ is selected to be proportional to flow velocity $v_S$. For example, a measuring frequency $f_M$=0.2 sec$^{-1}$ may be provided, for instance, for flow velocities $v_S$<0.5 m/sec, whereas a measuring frequency =1.0 sec$^{-1}$ may be provided for flow velocities $v_S$=30 m/sec. Therefore, a linear function describes the relationship between flow velocity $v_S$ and measuring frequency $f_M$ in the present example.

In continuous measuring operation, such an adjustment of measuring frequency $f_M$ to specific, current flow velocity $v_S$ is accomplished, in that, on the basis of a flow velocity $v_S$ just ascertained, measuring frequency $f_M$ for the subsequent measurements may be modified when ascertained flow velocity $v_S$ requires this.

Furthermore, it may be provided that, after the start of the temperature sensor being acted upon by the heating power, the regular temperature measurement is only begun after a defined delay time $t_{DEL}$. In this connection, delay time $t_{DEL}$ is selected to be large enough, that sequential electronics in a steady-state condition are available after delay time $t_{DEL}$ has elapsed. Otherwise, the measuring uncertainty is high. In an example embodiment, corresponding delay time $t_{DEL}$ is selected to be 200 μsec.

Since the exact resistance and, therefore, the temperature of the temperature sensor is known for each of the individual measuring times $t_{M,i}$, heating time $\Delta t_j$ may also be precisely determined by suitably interpolating between adjacent measuring times $t_{M,i}$, $t_{M,i+1}$, when, for instance, predefined temperature difference $\Delta T_j$ is reached between adjacent measuring times $t_{M,i}$, $t_{M,i+1}$.

As soon as the temperature sensor is heated up by the amount of predefined temperature difference $\Delta T_j$ during the measuring operation, after being acted upon by the specific heating power, the heating of the temperature sensor is ended. After a certain cycle time, e.g., after one second, the temperature sensor is acted upon again by the heating power in question, and so on. Therefore, the temperature sensor is not heated for most of the time during the measuring operation, i.e., the resulting current consumption may be considerably less than conventional air-velocity sensors, which function according to the constant-temperature method.

After flow velocity $v_S$ has been determined in the explained manner, it may be visualized, for example, on a display unit or converted into a transmittable signal and transmitted to a post-connected evaluation unit for further processing.

Figure 4:
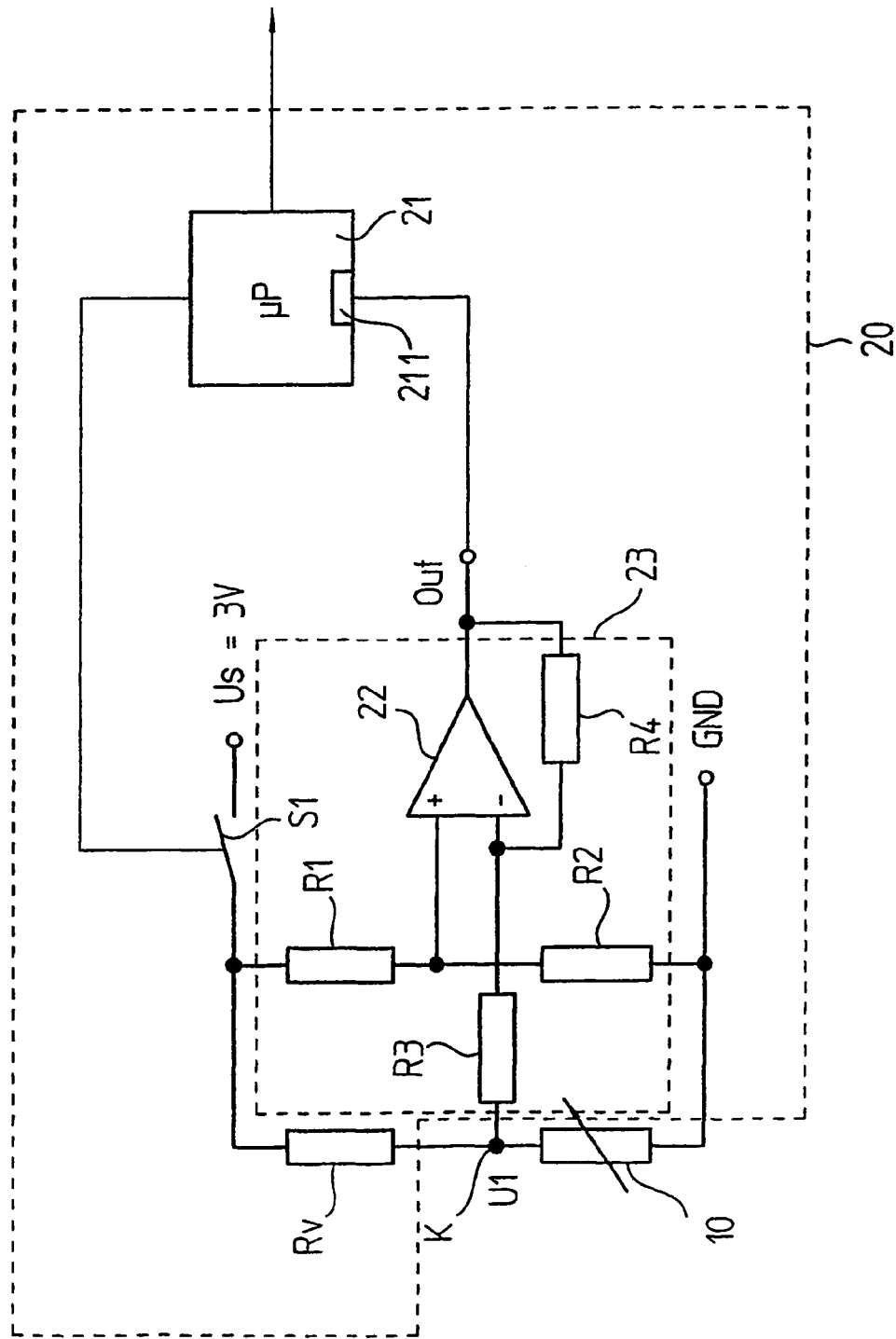
FIG. 4 is a block diagram of the air-velocity sensor illustrated in FIG. 1 for explaining the functioning principle.

The construction of an exemplary embodiment of the air-velocity sensor according to the present invention, including temperature sensor 10 and sequential electronics 20, is explained on the basis of the block diagram in FIG. 4.

Compared to a minimal variant, the variant of the air-velocity sensor shown in the figure represents an example embodiment, which is supplemented on the side of sequential electronics 20 with an amplifier stage 23 having several components R1 to R4, 22.

In addition to temperature sensor 10, it may be necessary for the air-velocity sensor to have at least one series resistor Rv connected in series with it, a voltage supply Us, as well as a switch element S1, which is used to apply voltage supply Us to temperature sensor 10 at specific times.

In order to determine the temperature at temperature sensor 10, a voltage measurement, which supplies measuring voltage U1, and from which the temperature of temperature sensor 10 may be determined on the basis of the known resistance-temperature characteristic in a conventional manner, is carried out at node K between temperature sensor 10 and series resistor Rv.

As previously explained above, an amplifier stage 23 is additionally provided in the represented exemplary embodiment, on the side of sequential electronics 20; measuring voltage U1 being amplified via the amplifier stage by a desired amplification factor V, e.g., V=20, before the voltage is transmitted via output Out to microprocessor 21 for further processing. This measure may ensure that no high-resolution A/D converter may be necessary in front of microprocessor 21 to measure voltage in a highly precise manner. Rather, A/D converters 21.1, which are already integrated in microprocessor 21 on the input side and provide resolutions between 8 and 12 bits, may be used.

Both temperature sensor 10 and series resistor Rv may have a conventional design. In this connection, temperature sensor 10 includes, more or less, a thin, glass supporting plate, to which conductor tracks made of material having a temperature-dependent resistance, e.g., molybdenum, nickel, platinum, etc., are applied. The temperature sensor 10 need not be a standard temperature sensor, such as a Pt1000 element. Rather, it may be sufficient when utilized temperature sensor 10 has a defined resistance-temperature characteristic. Series resistor Rv situated on the side of the sequential electronics is designed to be a standard resistor having good electrical stability, in the form of a metallic-film resistor of the model MiniMELF or 0805.

A semiconductor switch element, e.g., an FET, is used as switch element S1, and one or more batteries are provided as voltage supply Us.

In addition, sequential electronics 20 include microprocessor 21, which may assume a number of functions. These include the operation of switch element S1, the cyclical determination of the resistance of temperature sensor 10, the determination of the temperature of temperature sensor 10 from the resistance values, as well as the determination of the heating time required until the predefined temperature difference is reached. In the present exemplary embodiment, the determination of flow velocity $v_S$ from previously ascertained heating time $\Delta t_j$ is also accomplished by microprocessor 21.

At the beginning of a measurement, temperature sensor 10 and series resistor Rv are connected to voltage supply Us by switch element S1, which is operated by microprocessor 21. As soon as switch element S1 is closed the first time, measuring voltage U1 is measured for the first time. The electrical resistance of temperature sensor 10 may be ascertained from measuring voltage U1 and the measuring current in a conventional manner. Since the resistance of temperature sensor 10 changes in proportion with the temperature of temperature sensor 10, predefined temperature difference $\Delta T$ may be directly expressed as resistance change $\Delta R$. This resistance change $\Delta R$ is only systematically dependent on the specific ambient temperature to a small extent. The influence of the ambient temperature may be disregarded when the accuracy requirements are low. In the case of higher accuracy requirements, it may be easily possible to mathematically compensate for this.

In principle, the air-velocity sensor may be regarded as a mass flow sensor. This means that a calibration curve generated once only indicates the relationship between heating time $\Delta t_j$ and air velocity $v_S$ to be determined, for a specific temperature. In the case of higher temperatures, the density of the air and, therefore, the measured mass flow decreases in reverse proportion to the absolute temperature. This known relationship may be utilized for arithmetic compensation, since the temperature of the air may be ascertained from the resistance of temperature sensor 10. Therefore, the device may operate as an air-velocity sensor in the described manner, when such compensation is automatically carried out in the case of changing temperatures. However, it is also possible, in principal, to dispense with such compensation, so that the device actually operates as a mass-flow sensor and indicates the amount of air flowing through a defined cross-section per unit time.

At specific measuring times $t_M$, the determination of measuring voltage U1 is repeated and the respective resistance of temperature sensor 10 is ascertained in fixed time segments, i.e., at measuring frequency $f_M$ previously discussed, e.g., every 5 msec, while being controlled by microprocessor 21. The heating of temperature sensor 10 is monitored by microprocessor 21, until resistance change $\Delta R$ of temperature sensor 10 exceeds a particular threshold value, i.e., until temperature sensor 10 is heated up by the amount of predefined temperature difference $\Delta T_j$. As soon as this is the case, temperature sensor 10 is separated again from voltage supply Us by opening switch element S1. Required and measured heating time $\Delta t_j$ between the beginning of the measurement and the attainment of predefined resistance change $\Delta R$ is, in defined form, a function of flow velocity $v_S$ and the specific heating power at temperature sensor 10. In the case of a constant series resistance Rv, the heating power is only a minimal function of the heating of temperature sensor 10. This dependence may be disregarded in practice. The dependence on the supplied voltage supply is more marked. Therefore, if the constancy of the voltage supply cannot be adequately ensured, then it is possible to arithmetically compensate for its influence.

Furthermore, the suitable dimensioning of series resistor Rv may ensure that, even in the case of a minimal heating power and a maximum expectable ambient temperature, the predefined temperature difference may be reached during the heating.

Therefore, ascertained heating time $\Delta t_j$ may be used as a direct measure of flow velocity $v_S$. In microprocessor 21, flow velocity $v_S$ may be determined from heating time $\Delta t_j$ with the aid of one or more calibration curves, and the mentioned, possibly necessary corrections and compensation are carried out.

The result of this may be a simple system for determining flow velocities, which additionally may render the required, power-saving operation possible.

What is claimed is:

1. An air-velocity sensor, comprising:
   a temperature sensor configured to be arranged in an air flow; and
   sequential electronics configured to cyclically apply a predetermined heating power to the temperature sensor and to determine a heating time required by the temperature sensor to heat up by a predetermined temperature difference after being acted upon by the heating power, the sequential electronics configured to perform a regular temperature measurement at a predetermined temperature measuring frequency to determine the heating time, the temperature measuring frequency selected as a function of a flow velocity of the air flow and adapted to the flow velocity during a continuous measuring operation, the flow velocity determinable from the heating time.

2. The air-velocity sensor according to claim 1, wherein the sequential electronics include a voltage supply for the temperature sensor, a series resistor connected in series with the temperature sensor, and a switch element configured to connect the voltage supply to and disconnect the voltage supply from the temperature sensor.

3. The air-velocity sensor according to claim 2, wherein the series resistor is dimensioned to attain the predetermined temperature difference during heating for a minimum heating power and a maximum expectable ambient temperature.

4. The air-velocity sensor according to claim 2, wherein the sequential electronics include a microprocessor configured to operate the switch element, to cyclically determine at the temperature measuring frequency electrical resistance of the temperature sensor, to determine a current temperature of the temperature sensor from the resistance, to determine the heating time required until the predetermined temperature difference is reached, and to determine the flow velocity from the required heating time.

5. The air-velocity sensor according to claim 2, wherein the sequential electronics include an amplifier stage, including a plurality of resistors, and an operational amplifier configured to amplify a signal representing electrical resistance of the temperature sensor.

6. The air-velocity sensor according to claim 1, wherein the sequential electronics are configured to store at least one calibration curve that traces a relationship between the heating time and the flow velocity for a specific air-velocity sensor.

7. The air-velocity sensor according to claim 1, wherein the temperature sensor is arranged in a probe tube arranged in the air flow, and the sequential electronics are arranged on the probe tube spatially separated from the temperature sensor.

8. The air-velocity sensor according to claim 1, wherein the temperature sensor is arranged in a tube through which the air flow travels, and the sequential electronics are arranged on the tube spatially separated from the temperature sensor.

9. The air-velocity sensor according to claim 1, wherein the sequential electronics are configured to cyclically apply the predetermined heating power directly to the temperature sensor by connection to a voltage supply.

10. A method for operating an air-velocity sensor, the air-velocity sensor including a temperature sensor arranged in an air flow, and sequential electronics, comprising:
    cyclically acting upon the temperature sensor by a predetermined heating power by the sequential electronics;
    determining by the sequential electronics a heating time required by the temperature sensor to heat up by an amount of a predefined temperature difference after being acted upon by the heating power, including performing a regular temperature measurement by the sequential electronics at a predetermined temperature measuring frequency to determine the heating time;
    determining a flow velocity of the air flow from the heating time; and
    selecting the temperature measuring frequency as a function of the flow velocity and adapting the temperature measuring frequency to the current velocity during a continuous measuring operation.

11. The method according to claim 10, further comprising, after beginning heating of the temperature sensor, cyclically determining a temperature of the temperature sensor at predetermined measuring times at the temperature measuring frequency from electrical resistance values of the temperature sensor until the temperature sensor is heated by the amount of the predefined temperature difference.

12. The method according to claim 11, wherein the heating time is determined in the heating time determining step by interpolation of a temperature change between two measuring times.

13. The method according to claim 11, further comprising ending the heating of the temperature sensor after the temperature sensor is heated up by the amount of the predetermined temperature difference.

14. The method according to claim 10, further comprising measuring a voltage to determine a temperature of the temperature sensor.

15. The method according to claim 14, further comprising:
    amplifying the voltage measured in the voltage measuring step by an amplifier stage; and
    transmitting the amplified measured voltage to a microprocessor of the sequential electronics for further processing.

16. The method according to claim 10, further comprising, before the temperature measurement, recording at least one calibration curve that plots a relationship between the heating time and the flow velocity for a specific air-velocity sensor, the flow velocity determined in the flow velocity determining step from the heating time in accordance with the calibration curve.

17. The method according to claim 16, wherein the calibration curve is stored in the sequential electronics.

18. The method according to claim 10, further comprising visualizing the determined flow velocity on a display unit.

19. The method according to claim 10, further comprising:
converting the determined flow velocity into a transmittable signal; and
transmitting the transmittable signal to a post-connected evaluation unit for further processing.

20. The method according to claim 10, wherein the temperature measurement is started after a predetermined delay time after the temperature sensor has begun to be acted upon by the heating power.

21. The method according to claim 10, wherein the cyclically acting step includes cyclically applying the predetermined heating power directly to the temperature sensor by the sequential electronics by connection to a voltage supply.

22. An air-velocity sensor, comprising:
a temperature sensing means configured to be arranged in an air flow; and
sequential electronics means for cyclically applying a predetermined heating power to the temperature sensor and for determining a heating time required by the temperature sensor to heat up by a predetermined temperature difference after being acted upon by the heating power, the sequential electronics means for performing a regular temperature measurement at a predetermined temperature measuring frequency to determine the heating time, the temperature measuring frequency selected as a function of a flow velocity of the air flow and adapted to the flow velocity during a continuous measuring operation, the flow velocity determinable from the heating time.

23. The air-velocity sensor according to claim 22, wherein the sequential electronics means are for cyclically applying the predetermined heating power directly to the temperature sensing means by connection to voltage supply means.

* * * * *